T864024

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED JULY 29, 1969

864 O.G. 1407

815,499

PHOSPHATE BUFFERS IN PHOTOGRAPHIC ELEMENTS

Richard F. Bulgin, 37 Hastings Way, Croxley Green, Herts, England

Filed Apr. 11, 1969. Published July 29, 1969
Int. Cl. G03c *5/38*
U.S. Cl. 96—61
No Drawing. 17 Pages Specification

Buffers, i.e., compounds which maintain a desired concentration of hydrogen ion and hydroxide ion or a desired pH level, such as phosphate buffers in photographic elements containing a developer and/or stabilizer such as o-mercaptobenzoic acid, upon processing the element, provide (a) increased maximum density, (b) less tendency to stain and (c) improved stability. Buffers in photographic elements are useful, for example, in stabilization processing.